US008346800B2

(12) United States Patent
Szummer et al.

(10) Patent No.: US 8,346,800 B2
(45) Date of Patent: Jan. 1, 2013

(54) CONTENT-BASED INFORMATION RETRIEVAL

(75) Inventors: Martin Szummer, Cambridge (GB);
Andrew Fitzgibbon, Cambridge (GB);
Lorenzo Torresani, Hanover, NH (US)

(73) Assignee: Microsoft Corporation, Redmond, WA (US)

( * ) Notice: Subject to any disclaimer, the term of this patent is extended or adjusted under 35 U.S.C. 154(b) by 600 days.

(21) Appl. No.: 12/417,511

(22) Filed: Apr. 2, 2009

(65) Prior Publication Data
US 2010/0257202 A1    Oct. 7, 2010

(51) Int. Cl.
*G06F 17/30* (2006.01)

(52) U.S. Cl. .............. 707/772; 707/771; 707/E17.02; 707/E17.016

(58) Field of Classification Search .......... 707/999.005, 707/772, 771, E17.016, E17.02, 999.003
See application file for complete search history.

(56) References Cited

U.S. PATENT DOCUMENTS

| | | | |
|---|---|---|---|
| 5,291,563 A * | 3/1994 | Maeda | 382/103 |
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,812,865 A | 9/1998 | Theimer et al. | |
| 5,913,205 A * | 6/1999 | Jain et al. | 1/1 |
| 5,983,214 A | 11/1999 | Lang et al. | |
| 5,983,237 A * | 11/1999 | Jain et al. | 1/1 |
| 6,161,130 A * | 12/2000 | Horvitz et al. | 709/206 |
| 6,466,232 B1 | 10/2002 | Newell et al. | |
| 6,513,046 B1 | 1/2003 | Abbott, III et al. | |
| 6,549,915 B2 | 4/2003 | Abbott, III et al. | |
| 6,563,950 B1 | 5/2003 | Wiskott et al. | |
| 6,574,378 B1 * | 6/2003 | Lim | 382/305 |
| 6,675,159 B1 * | 1/2004 | Lin et al. | 1/1 |
| 6,747,675 B1 | 6/2004 | Abbott et al. | |
| 6,791,580 B1 | 9/2004 | Abbott et al. | |
| 6,801,223 B1 | 10/2004 | Abbott et al. | |
| 6,812,937 B1 | 11/2004 | Abbott et al. | |

(Continued)

FOREIGN PATENT DOCUMENTS

JP        2002297648        10/2002

(Continued)

OTHER PUBLICATIONS

Torresani et al., "Learning Query-Dependent Prefilters for Scalable Image Retrieval", CVPR 2009, 8 pages.*

(Continued)

*Primary Examiner* — Phuong Thao Cao
(74) *Attorney, Agent, or Firm* — Zete Law, P.L.L.C.; MacLane C. Key (57) ABSTRACT

Content-based information retrieval is described. In an example, a query item such as an image, document, email or other item is presented and items with similar content are retrieved from a database of items. In an example, each time a query is presented, a classifier is formed based on that query and using a training set of items. For example, the classifier is formed in real-time and is formed in such a way that a limit on the proportion of the items in the database that will be retrieved is set. In an embodiment, the query item is analyzed to identify tokens in that item and subsets of those tokens are selected to form the classifier. For example, the subsets of tokens are combined using Boolean operators in a manner which is efficient for searching on particular types of database.

17 Claims, 6 Drawing Sheets

U.S. PATENT DOCUMENTS

| | | | |
|---|---|---|---|
| 6,842,877 B2 | 1/2005 | Robarts et al. | |
| 6,892,191 B1* | 5/2005 | Schaffer | 706/14 |
| 6,968,333 B2 | 11/2005 | Abbott et al. | |
| 7,089,241 B1* | 8/2006 | Alspector et al. | 1/1 |
| 7,194,483 B1 | 3/2007 | Mohan et al. | |
| 7,362,892 B2* | 4/2008 | Lewis et al. | 382/159 |
| 7,624,337 B2 | 11/2009 | Sull et al. | |
| 7,657,100 B2* | 2/2010 | Gokturk et al. | 382/209 |
| 7,739,221 B2* | 6/2010 | Lawler et al. | 707/770 |
| 7,783,094 B2 | 8/2010 | Collins et al. | |
| 7,840,059 B2* | 11/2010 | Winn et al. | 382/155 |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2001/0046332 A1* | 11/2001 | Chang | 382/305 |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0069218 A1 | 6/2002 | Sull et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0095412 A1 | 7/2002 | Lee et al. | |
| 2002/0099817 A1 | 7/2002 | Abbott et al. | |
| 2002/0111794 A1 | 8/2002 | Yamamoto et al. | |
| 2003/0028522 A1 | 2/2003 | Collins-Thompson et al. | |
| 2003/0044062 A1 | 3/2003 | Ganapathy et al. | |
| 2003/0046401 A1 | 3/2003 | Abbott et al. | |
| 2003/0123721 A1* | 7/2003 | Megiddo et al. | 382/159 |
| 2003/0154476 A1 | 8/2003 | Abbott, III et al. | |
| 2003/0177111 A1 | 9/2003 | Egendorf et al. | |
| 2003/0195883 A1* | 10/2003 | Mojsilovic et al. | 707/6 |
| 2004/0024790 A1 | 2/2004 | Everett | |
| 2004/0202349 A1* | 10/2004 | Erol et al. | 382/100 |
| 2004/0218827 A1* | 11/2004 | Cohen et al. | 382/243 |
| 2004/0234136 A1* | 11/2004 | Zhu et al. | 382/224 |
| 2005/0008263 A1* | 1/2005 | Nagahashi et al. | 382/305 |
| 2005/0021512 A1 | 1/2005 | Koenig | |
| 2005/0034078 A1 | 2/2005 | Abbott et al. | |
| 2005/0084154 A1* | 4/2005 | Li et al. | 382/190 |
| 2005/0100209 A1* | 5/2005 | Lewis et al. | 382/159 |
| 2005/0108001 A1 | 5/2005 | Aarskog | |
| 2005/0114313 A1* | 5/2005 | Campbell et al. | 707/3 |
| 2005/0135664 A1 | 6/2005 | Kaufhold et al. | |
| 2005/0196035 A1* | 9/2005 | Luo et al. | 382/159 |
| 2005/0289448 A1 | 12/2005 | Megiddo et al. | |
| 2006/0012677 A1 | 1/2006 | Neven, Sr. et al. | |
| 2006/0015492 A1 | 1/2006 | Keating et al. | |
| 2006/0026114 A1* | 2/2006 | Gregoire et al. | 707/1 |
| 2006/0115108 A1 | 6/2006 | Rodriguez et al. | |
| 2006/0116994 A1 | 6/2006 | Jonker et al. | |
| 2006/0143176 A1 | 6/2006 | Mojsilovic et al. | |
| 2006/0143254 A1* | 6/2006 | Chen et al. | 707/205 |
| 2006/0184475 A1* | 8/2006 | Krishnan et al. | 706/20 |
| 2006/0221357 A1 | 10/2006 | Uzawa | |
| 2006/0224603 A1 | 10/2006 | Correll, Jr. | |
| 2006/0227992 A1 | 10/2006 | Rathus et al. | |
| 2006/0248044 A1* | 11/2006 | Zhang et al. | 707/1 |
| 2006/0274928 A1 | 12/2006 | Collins et al. | |
| 2007/0033170 A1 | 2/2007 | Sull et al. | |
| 2007/0041638 A1* | 2/2007 | Liu et al. | 382/170 |
| 2007/0179918 A1* | 8/2007 | Heisele et al. | 706/13 |
| 2007/0183651 A1* | 8/2007 | Comaniciu et al. | 382/154 |
| 2007/0203700 A1 | 8/2007 | Toyama | |
| 2007/0258648 A1* | 11/2007 | Perronnin | 382/224 |
| 2007/0276818 A1* | 11/2007 | Cook et al. | 707/3 |
| 2007/0294223 A1* | 12/2007 | Gabrilovich et al. | 707/3 |
| 2007/0297682 A1* | 12/2007 | Zhang et al. | 382/224 |
| 2008/0005091 A1* | 1/2008 | Lawler et al. | 707/4 |
| 2008/0016020 A1 | 1/2008 | Estes | |
| 2008/0040749 A1 | 2/2008 | Hoffberg et al. | |
| 2008/0046418 A1 | 2/2008 | Johnston et al. | |
| 2008/0065596 A1 | 3/2008 | Shadmon et al. | |
| 2008/0065964 A1 | 3/2008 | Zarrinkoub et al. | |
| 2008/0069456 A1* | 3/2008 | Perronnin | 382/228 |
| 2008/0086433 A1* | 4/2008 | Schmidtler et al. | 706/12 |
| 2008/0118151 A1* | 5/2008 | Bouguet et al. | 382/181 |
| 2008/0247609 A1* | 10/2008 | Feris et al. | 382/118 |
| 2008/0270376 A1* | 10/2008 | Svore et al. | 707/5 |
| 2008/0275870 A1* | 11/2008 | Shanahan et al. | 707/5 |
| 2008/0281764 A1* | 11/2008 | Baxter | 706/12 |
| 2009/0148010 A1* | 6/2009 | Boroczky et al. | 382/128 |
| 2009/0148068 A1* | 6/2009 | Woodbeck | 382/305 |
| 2009/0172730 A1* | 7/2009 | Schiff et al. | 725/34 |
| 2009/0304272 A1* | 12/2009 | Makadia et al. | 382/165 |
| 2010/0082627 A1* | 4/2010 | Lai et al. | 707/738 |
| 2010/0082642 A1* | 4/2010 | Forman et al. | 707/749 |
| 2010/0082752 A1* | 4/2010 | Donato et al. | 709/206 |
| 2010/0125568 A1* | 5/2010 | van Zwol et al. | 707/722 |
| 2010/0177943 A1* | 7/2010 | Zhao et al. | 382/131 |
| 2010/0205198 A1* | 8/2010 | Mishne et al. | 707/759 |
| 2010/0250523 A1* | 9/2010 | Jin et al. | 707/723 |

FOREIGN PATENT DOCUMENTS

| | | |
|---|---|---|
| JP | 2002318812 | 10/2002 |
| WO | WO9800787 A1 | 1/1998 |

OTHER PUBLICATIONS

Hentschel et al., "Automatic Image Annotation using a Visual Dictionary Based on Reliable Image Segmentation", Springer-Verlag 2008, 12 pages.*

Veltkamp et al., "Content-Based Image Retrieval Systems: A Survey", 2002, 62 pages.*

Kinh Tieu, et al., "Boosting Image Retrieval", Special Issue on Content-Based Image Retrieval / International Journal of Computer Vision, Jan. 1, 2004, pp. 1-32.*

Rong Yan et al., "Multiple Search with Pseudo-Relevance Feedback", CIVR 2003, LNCS 2728, Jan. 1, 2003, pp. 238-247.*

Wu et al., "Discriminant-EM Algorithms with Application to Image Retrieval", In Proceeding of IEEE Conference on CVPR, 2000, vol. I, pp. 222-227.*

Tong et al., "Support Vector Machine Active Learning with Application with Text Classification", Journal of Machine Learning Research, 2001, pp. 45-66.*

Torresani et al., "Learining Query-Dependent Prefilters for Scalable Image Retrieval", In CVPR, Jun. 2009, 8 pages, accessed online at <http://www.cs.dartmouth.edu/~lorenzo/Papers/tsf-cvpr09.pdf> on Aug. 25, 2012.*

Naqa et al., "Content-Based Image Retrieval for Digital Mammography", ICIP, 2002, 4 pages, accessed online at <http://pdf.aminer.org/000/317/384/content_based_image_retrieval_for_digital_mammography.pdf> on Aug. 25, 2012.*

Janecek et al., "On the Relationship between Feature Selection and Classification Accuracy", JMLR: Workshop and Conference Proceedings 4: pp. 90-105 (16 pages), 2008, accessed online at <http://jmlr.csail.mit-edu/proceedings/papers/v4/janecek08a/janecek08a.pdf> on Aug. 25, 2012.*

Bruzzo, et al., "Content Fuzzy Learning for Remote Sensing Image Database Systems", retrieved on Feb. 5, 2009 at <<http://ieeexplore.ieee.org/stamp/stamp.jsp?arnumber=976785&isnumber=21047>>, IEEE 2001, pp. 1182-1184.

Chum, et al., "Near Duplicate Image Detection: min-Hash and tf-idf Weighting", retrieved on Feb. 5, 2009 at <<http://cmp.felk.cvut.cz/~chum/papers/chum_bmvc08.pdf>>, proceedings of the British Machine Vision Conference 2008, 10 pages.

Chum, et al., "Scalable Near Identical Image and Shot Detection", retrieved on Feb. 5, 2009 at <<http://www.robots.ox.ac.uk/~vgg/publications/papers/chum07.pdf>>, CIVR 2007, Jul. 9-11, 2007, Amsterdam, The Netherlands, 8 pages.

Daptardar, et al., "Reduced Complexity Content-Based Image Retrieval using Vector Quantization", retrieved on Feb. 5, 2009 at <<http://ieeexplore.ieee.org/stamp/stamp.jsp?arnumber=1607269&isnumber=33750>>, Proceedings of the Data Compression Conference (DCC 2006), 10 pages.

Friedman, et al., "Bump hunting in high-dimensional data", retrieved on Feb. 5, 2009 at <<http://www.springerlink.com/content/x3gpv05t34620878/fulltext.pdf>>, Statistics and Computing (1999) 9, pp. 123-143.

Frome, et al., "Image Retrieval and Classification Using Local Distance Functions", retrieved on Feb. 5, 2009 at <<http://books.nips.cc/papers/files/nips19/NIPS2006_0763.pdf>>, 8 pages.

Grauman, et al., "The Pyramid Match Kernel: Efficient Learning with Sets of Features", retrieved on Feb. 5, 2009 at <<http://groups.csail.mit.edu/vision/vip/papers/grauman_jmlr07.pdf>>, Journal of machine Learning Research 8 (2007) pp. 725-760.

Griffin, et al., "Caltech-256 Object Category Dataset", retrieved on Feb. 5, 2009 at <<http://authors.library.caltech.edu/7694/1/CNS-TR-2007-001.pdf>>, pp. 1-20.

Jain, et al., "Fast Image Search for Learned Metrics", retrieved on Feb. 5, 2009 at <<http://www.cs.utexas.edu/~grauman/papers/jain_kulis_grauman_cvpr2008.pdf>>, In Proceedings of the IEEE Conference on Computer Vision and Patter Recognition (CVPR), Jun. 2008, 8 pages.

Jegou, et al., "A contextual dissimilarity measure for accurate and efficient image search", retrieved on Feb. 5, 2009 at <<http://lear.inrialpes.fr/pubs/2007/JHS07/jegou_cdm.pdf>>, INRIA-LEAR, 8 pages.

Jegou, et al., "Hamming embedding and weak geometric consistency for large scale image search", retrieved on Feb. 5, 2009 at <<http://learinrialpes.fr/pubs/2008/JDS08/jegou_hewgc08.pdf>>, INRIA Grenoble, LEAR, LJK, 15 pages.

Lazebnik, et al., "A Discriminative Framework for Texture and Object Recognition Using Local Image Features", retrieved on Feb. 5, 2009 at <<http://www.di.ens.fr/willow/pdfs/sicily06a.pdf>>, pp. 1-20.

Manning, et al., "An Introduction to Information Retrieval", retrieved on Feb. 5, 2009 at <<http://nlp.stanford.edu/IR-book/pdf/irbookonlinereading.pdf>>, Apr. 1, 2009, 581 pages.

Marchand, et al., "The Set Covering Machine", retrieved on Feb. 5, 2009 at <<http://jmlr.csail.mit.edu/papers/volume3/marchand02a/marchand02a.pdf>>, Journal of Machine Learning Research 3 (2002), pp. 723-746.

Moosmann, et al., "Randomized Clustering Forests for Image Classification", retrieved on Feb. 5, 2009 at <<http://ieeexploreieee.org/stamp/stamp.jsp?arnumber=4384498&isnumber=4567786>>, IEEE Transactions on Pattern Analysis and Machine Intelligence, vol. 30, No. 9, Sep. 2008, pp. 1632-1646.

Nister, et al., "Scalable Recognition with a Vocabulary Tree", retrieved on Feb. 5, 2009 at <<http://www.vis.uky.edu/~stewe/publications/nister_stewenius_cvpr2006.pdf>>, Center for Visualization and Virtual Environments, Department of Computer Science, University of Kentucky, CVPR 2006, 8 pages.

Philbin, et al., "Object retrieval with large vocabularies and fast spatial matching", retrieved on Feb. 5, 2009 at <<http://www.robots.ox.ac.uk/~vgg/publications/papers/philbin07.pdf>>, CVPR 2007, IEEE Conference on Computer Vision, 8 pages.

Quack, et al., "Efficient Mining of Frequent and Distinctive Feature Configurations", retrieved on Feb. 5, 2009 at <<http://class.inrialpes.fr/pub/213-quack-iccv07.pdf>>, pp. 1-8.

Sawhney, et al., "Efficient Color Histogram Indexing", retrieved on Feb. 5, 2009 at <<http://ieeexploreieee.org/stamp/stamp.jsp?arnumber=413532&isnumber=9213>>, IEEE 1994, pp. 66-70.

Selvarani, et al., "Medical Image Retrieval by Combining Low Level Features and Dicom Features", retrieved on Feb. 5, 2009 at <<http://ieeexplorejeee.org/stamp/stamp.jsp?arnumber=4426645&isnumber=4426531>>, International Conference on Computational Intelligence and Multimedia Applications 2007, pp. 587-591.

Shin, et al., "Image retrieval using VQ-based local Gabor feature", retrieved on Feb. 5, 2009 at <<http://ieeexploreieee.org/stamp/stamp.jsp?arnumber=1006785&isnumber=21721>>, Electronic Letters, May 23, 2002, vol. 38, No. 11, pp. 505-507.

Sivic, et al., "Video Data Mining Using Configurations of Viewpoint Invariant Regions", retrieved on Feb. 5, 2009 at <<http://www.robots.ox.ac.uk/~vgg/publications/papers/sivic04b.pdf>>, Robotic Research Group, Department of Engineering Science, University of Oxford, pp. 1-8.

Vereb, "On a Hierarchical Indexing Fuzzy Content-based Image Retrieval Approach", retrieved on Feb. 5, 2009 at <<http://ftp.informatik.rwth-aachen.de/Publications/CEUR-WS/Vol-76/vereb.pdf>>, University of Debrecen, Institute of Informatics, Department of Information Technology, Hungary, 5 pages.

Yuan, et al., "Discovery of Collocation Patterns: from Visual Words to Visual Phrases", retrieved on Jun. 16, 2009 at <<http://ieeexplore.ieee.org/stamp/stamp.jsp?arnumber=4270247&isnumber=4269956>>, IEEE 2007, 8 pages.

Zheng, et al., "Visual Synset: Towards a Higher-level Visual Representation", retrieved on Feb. 5, 2009 at <<http://mplab.ucsd.edu/wp-content/uploads/CVPR2008/Conference/data/papers/271.pdf>>, IEEE 2008, 8 pages.

Zitnick, et al., "Object instance recognition using triplets of feature symbols", retrieved on Feb. 5, 2009 at <<ftp://ftp.research.microsoft.com/pub/tr/TR-2007-53.pdf>>, 15 pages.

Advisory action for U.S. Appl. No. 11/427,305, mailed on Jan. 12, 2009, Stephen Lawler, "Visual and Multi-Dimensional Search", 3 pages.

Billinghurst, et al., "An Evlauation of Wearable Information Spaces", Proceedings of the Virtual Reality Annual International Symposium, 1998, 8 pages.

Billinghurst, "Research Directions in Wearable Computing", University of Washington, May 1998, 48 pages.

Billinghurst, et al., "Wearable Devices: New Ways to Manage Information", IEEE Computer Society, Jan. 1999, pp. 57-64.

Chen, et al., "A Survey of Context-Aware Mobile Computing Research", Dartmouth Computer Science Technical Report, 2000, 16 pages.

The Chinese Office Action mailed Jan. 7, 2012 for Chinese patent application No. 200780024431.X, a counterpart foreign application of US patent No. 7,739,221, 7 pages.

Translated Chinese Office Action mailed Jul. 25, 2011 for Chinese patent application No. 200780024431.X, a counterpart foreign application of US patent No. 7,739,221.

Funkhouser, et al., "A Search Engine for 3D Models", ACM Transactions on Graphics, Jan. 2003.

Harter, et al., "A Distributed Location System for the Active Office", IEEE Network, 1994, pp. 62-70.

Horvitz, et al., "Attention-Sensitive Alerting in Computing Systems", Microsoft Research, Aug. 1999.

Horvitz, et al., "In Pursuit of Effective Handsfree Decision Support: Coupling Bayesian Inference, Speech Understanding, and User Models", 1995, 8 pages.

IEEE Xplore, not matched results, Nov. 11, 2009, p. 1.

Image Understanding, Stuart Shapiro, google.c9om, 1996, pp. 1-13.

International Search Report dated Nov. 30, 2007 for PCT Application Serial No. PCT/US2007/014990, 7 Pages.

Joachims, "Text Categorization with Support Vector Machines: Learning with Many Relevant Features", Machine Learning, European Conference on Machine Learning, Apr. 21, 1998, pp. 137-142.

Losee, "Minimizing information overload: the ranking of electronic messages", Journal of Information Science 15, Elsevier Science Publishers B.V., 1989, pp. 179-189.

Notice of Allowance from the U.S. Appl. No. 11/427,305, mailed on Nov. 18, 2010, Stephen Lawler, "Visual and Multi-Dimensional Search", 7 pages.

Office Action for U.S. Appl. No. 11/427,305, mailed on Apr. 7, 2008, Stephen Lawler, "Visual and Multi-Dimensional Search", 10 pages.

Office action for U.S. Appl. No. 11/427,305, mailed on Jan. 25, 2010, Stephen Lawler, "Visual and Multi-Dimensional Search", 14 pages.

Office action for U.S. Appl. No. 11/427,305, mailed on Apr. 14, 2009, Stephen Lawler, "Visual and Multi-Dimensional Search", 13 pages.

Office action for U.S. Appl. No. 11/427,305, mailed on Jun. 23, 2010, Stephen Lawler, "Visual and Multi-Dimensional Search", 16 pages.

Final Office Action for U.S. Appl. No. 13/048,661, mailed on Jan. 20, 2011, Stephen Lawler et al., "Visual and Multi-Dimensional Search ", 13 pages.

Office action for U.S. Appl. No. 11/427,305, mailed on Nov. 27, 2009, Stephen Lawler, "Visual and Multi-Dimensional Search", 15 pages.

Rhodes, et al., "Remembrance Agent: A continuously running automated information retrieval system", The Proceedings of the First International Conference on the Practical Application of Intelligent Agents and Multi Agent Technology, 1996, pp. 487-495.

Rhodes, "The wearable remembrance agent: A system for augmented memory", Personal Technologies Journal Special Issue on Wearable Computing, 1997, 12 pages.

Schilit, "A System Architecture for Context-Aware Mobile Computing", Columbia University, 1995, 153 pages.

Schilit, et al., "Context-Aware Computing Applications", In Proceedings of the Workshop on Mobile Computing Systems and Applications, Dec. 1994, pp. 85-90.

Schilit, et al., "Customizing Mobile Applications", Proceedings USENIX Symposium on Mobile and Location Independent Computing, Aug. 1993, 9 pages.

Schilit, et al., "Disseminating Active Map Information to Mobile Hosts", IEEE Network, 1994, pp. 22-32, vol. 8—No. 5.

Schilit, et al., "The ParcTab Mobile Computing System", IEEE WWOS-IV, 1993, 4 pages.

Spoken dialogue technology: enabling the conversational user interface, Michael McTear, ACM, Mar. 2002, pp. 1-80.

Spreitzer, et al., "Architectural Considerations for Scalable, Secure, Mobile Computing with Location Information", In The 14th International Conference on Distributed Computing Systems, Jun. 1994. pp. 29-38.

Spreitzer, et al., "Providing Location Information in a Ubiquitous Computing Environment", SIGOPS '93, 1993, pp. 270-283.

Spreitzer, et al., "Scalable, Secure, Mobile Computing with Location Information", Communications of the ACM, Jul. 1993, 1 page, vol. 36 No. 7.

Starner, "Wearable Computing and Contextual Awareness", Massachusets Institute of Technology, Jun. 1999, 248 pages.

Theimer, et al., "Operating System Issues for PDAs", In Fourth Workshop on Workstation Operating Systems, 1993, 7 pages.

Wactar, et al., Complimentary Video and Audio Analysis for Broadcast News Archives, Communications of the ACM vol. 43, No. 2, Feb. 2000.

Want, et al., "Active Badges and Personal Interactive Computing Objects", IEEE Transactions on Consumer Electronics, 1992, 11 pages, vol. 38 No. 1.

Want, et al.,, "The Active Badge Location System", ACM Transactions on Information Systems, Jan. 1992,pp. 91-102, vol. 10 No. 1.

Weiser, "Some Computer Science Issues in Ubiquitous Computing", Communications of the ACM, Jul. 1993, pp. 75-84, vol. 36 No. 7.

Weiser, "The Computer for the 21 st Century", Scientific American, Sep. 1991, 8 pages.

Workshop on Wearable Computing systems, Aug. 19-21, 1996.

Yeh, et al., "A Picture is Worth a Thousand Keywords: Image-Based Object Search on a Mobile Platform", In CHI 2005, Conference on Human Factors in Computing Systems, Portland, OR, Apr. 2005.

Yeh, et al., "Searching the Web with Mobile Images for Location Recognition". Proceedings of the 2004 IEEE Computer Society Conference on Computer Vision and Pattern Recognition (CVRP'04).

Mori, et al., "Correlating Text and Image by Learning from Database", Speech/voice recognition and dialogue processing seminar material (30), pp. 13-16, Japanese Society for Artificial Intelligence, Japan, Nov. 9, 2000 (SIG-SLUD-A002).

Translated Japanese Office Action mailed Jun. 1, 2012 for Japanese patent application No. 2009-518262 , a counterpart foreign application of US patent No. 7,739,221, 14 pages.

* cited by examiner

CONTENT-BASED INFORMATION RETRIEVAL

BACKGROUND

Content-based information retrieval systems are known in which a query item such as an image or text document is presented and the system automatically analyses the content of the query item. This content analysis is then used by the information retrieval system to find other items from a database which have similar content. This type of search is sometimes referred to as "similar item" search because an example item is presented as the query. In contrast, keyword search for example, involves keywords being presented as the query to find items such as documents. There is an ongoing need to improve the performance of such content-based information retrieval systems. For example, to improve the relevance of retrieved items, to improve the speed of operation and to provide generality in the results, that is, to retrieve items that are generally similar to the query item rather than being almost identical to it or having some identical features.

As information is to be retrieved from ever larger databases of items, for example, for web-scale retrieval, the need for fast, efficient and good quality information retrieval systems grows.

A typical example of similar-item search is in the field of content-based image retrieval. This type of search has traditionally been approached as a text-retrieval problem by mapping image features into integer numbers (known as visual words) representing clusters in feature space. The mapping is defined by a dictionary specifying the feature clusters. Each image is then represented as a histogram of visual words. A pre-filtering process is used to find a small set of images having histograms likely to be similar to the histogram of the query image. Existing approaches take the list of visual words in the query image and run a search on a database to retrieve images containing any of the visual words from the query image. The retrieved images form a filter set which is then provided to a ranking system to further refine the search results. However, typical previous pre-filtering methods have retrieved over 40% of the images in the database and thus yield filter sets which are too large for web-scale retrieval. Furthermore, these previous approaches have typically used very large dictionaries of visual words which generalize poorly for measuring similarity of general object classes as opposed to specific object instances. Also where large dictionaries are used the resulting filter sets are often unsuitable for many types of ranking functions.

The embodiments described herein are not limited to implementations which solve any or all of the disadvantages of known content-based information retrieval systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Content-based information retrieval is described. In an example, a query item such as an image, document, email or other item is presented and items with similar content are retrieved from a database of items. In an example, each time a query is presented, a classifier is formed based on that query and using a training set of items. For example, the classifier is formed in real-time and is formed in such a way that a limit on the proportion of the items in the database that will be retrieved is set. In an embodiment, the query item is analyzed to identify tokens in that item and subsets of those tokens are selected to form the classifier. For example, the subsets of tokens are combined using Boolean operators in a manner which is efficient for searching on particular types of database. In some embodiments a candidate pool of token subsets is generated using an off-line training process and used when forming the classifier. In an embodiment a fast, high quality image search system is provided which operates for web-scale information retrieval.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an image search system, the system described is provided as an example and not a limitation. As those skilled in the art will appreciate, the present examples are suitable for application in a variety of different types of content-based information retrieval systems.

The term "visual word" is used to refer to an integer number or other symbol representing a cluster of image features.

Figure 1:
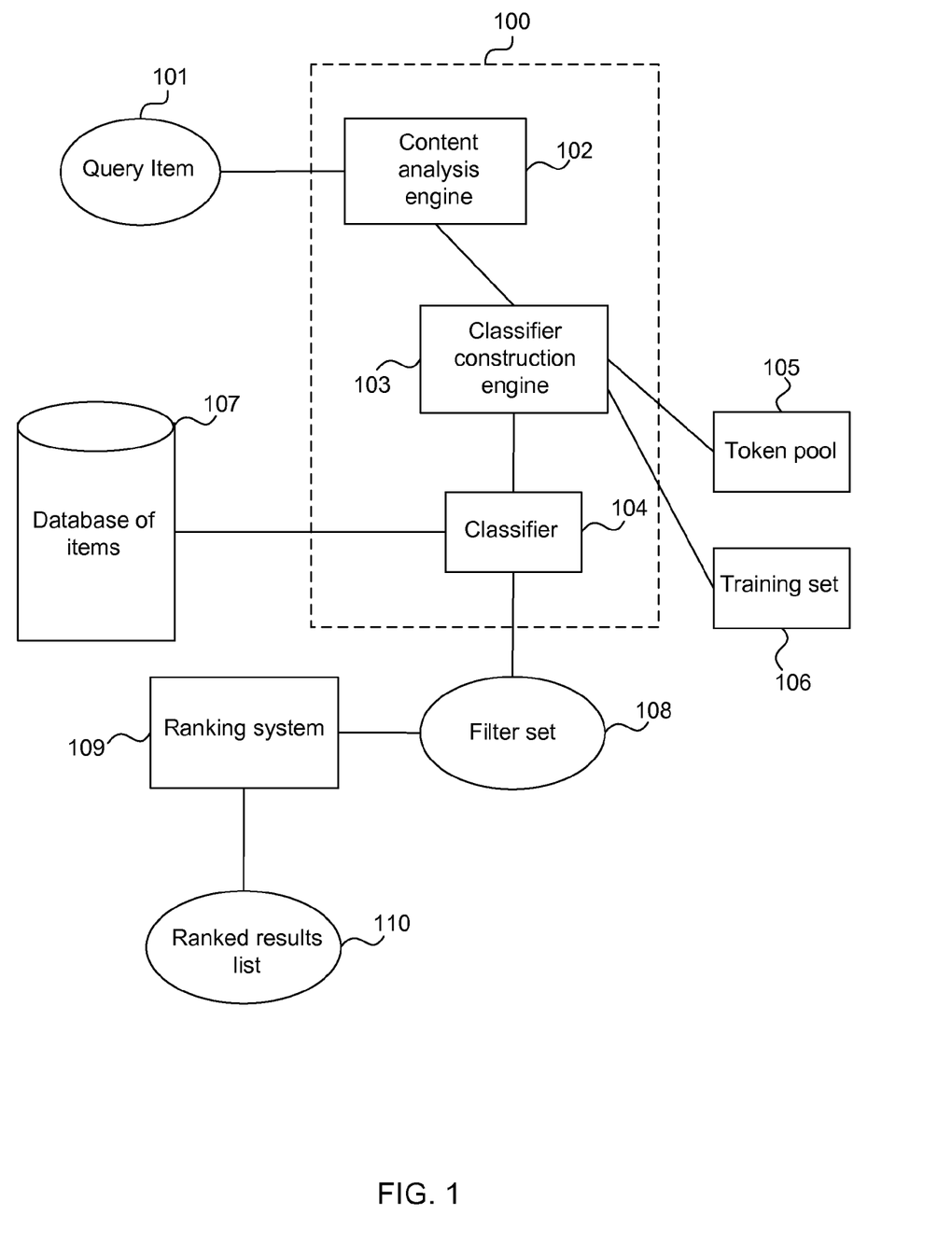
FIG. 1 is a schematic diagram of a content-based information retrieval system.

FIG. 1 is a schematic diagram of a content-based information retrieval system 100 arranged to receive a query item 101. The query item may be an image, a document, a web page, an email, a voice mail message, an audio file, a file, a folder, a video clip or file, or any other type of item for which it is required to find similar items from a database of such items 107. The information retrieval system 100 functions as a pre-filter to produce a filter set 108 comprising a plurality of items selected from the database 107. This filter set 108 may be provided to a ranking system 109 of any suitable type to further refine the filter set and produce a ranked results list 110. In examples described herein the information retrieval system acts as a pre-filter to retrieve a small percentage of the items in the database 107. For example, a filter set of the order 0.001% of the items in the database may be produced which enables the system to be used for web-scale retrieval applications. However, this is not essential, filter sets may be produced of any size relative to the database.

The information retrieval system 100 has access to a training set of items 106 which may be stored at any suitable location accessible to or integral with the information retrieval system. The training set comprises a plurality of pairs of items and a plurality of general or background items. For each pair, the items in that pair are specified as being similar to one another. In some embodiments the training set comprises items that are examples of a similar type as the query item although this is not essential. For example, in the case of image search, the query item may be an image of a giant panda and the training set may comprise no images of giant pandas.

In some embodiments an off-line process is used to generate a token pool 105 from the training set. This token pool 105 comprises candidate subsets of tokens for use by a classifier construction engine 103. More detail about the generation of the token pool is given below.

The information retrieval system 100 comprises a content analysis engine 102 a classifier construction engine 103 and one or more classifiers 104 formed by the classifier construction engine 103.

The content analysis engine 102 is arranged to take the query item 101 as input and to identify tokens in the query items using a library or dictionary of possible tokens. Each token is a symbol such as an integer number representing a cluster of features. For example, in the case that the query item is an image the token may be a visual word. In the case that the query item is a text document the token may be a written word. In the case that the query item is an audio file the token may be a cluster of audio features. In some embodiments, the content analysis engine forms a histogram of the tokens identified in the query item.

The content analysis engine comprises processing capability able to identify the tokens in the query item. For example, in the case that the query item is an image this may comprise detectors to automatically identify image regions and map those to visual words using a dictionary of visual words.

A classifier construction engine 103 is provided which receives the tokens identified in the query item and optionally other information about the query item. The classifier construction engine 103 has access to a token pool 105 in some embodiments and/or to a training set of items 106. In some embodiments the classifier construction engine is arranged to operate dynamically at query-time to form a classifier 104 suitable for classifying database items as being either similar to or not similar to the query item 101. The classifier may be formed in any suitable manner such that it classifies database items on the basis of their similarity to the query item. The classifier is said to be "query-dependent" because it is formed using tokens from the query itself. More detail about the classifier construction engine is given below with reference to FIG. 3.

Figure 2:
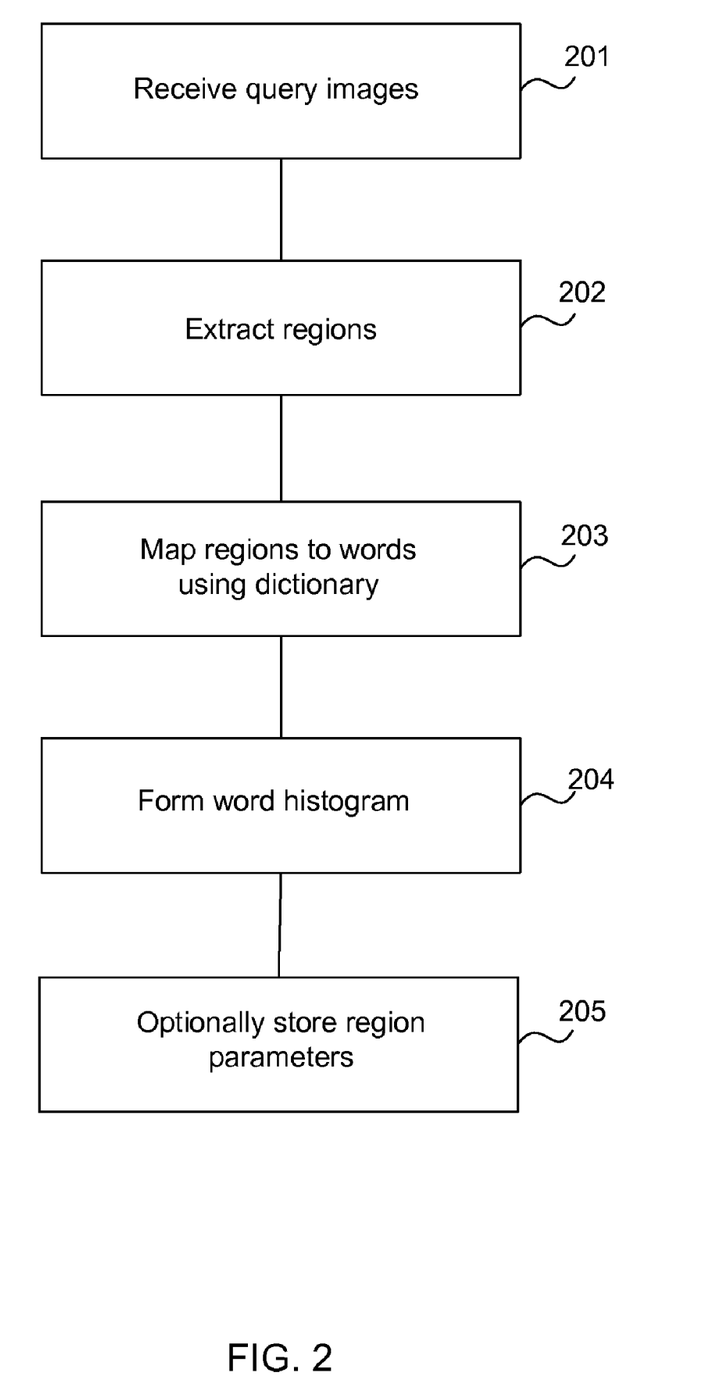
FIG. 2 is a flow diagram of a method of content analysis at a content-based information retrieval system.

As mentioned above the content analysis engine 102 is arranged in some embodiments to identify visual words in images. This is now described with reference to FIG. 2. The content analysis engine 102 receives a query image 201 and extracts 202 image regions from that image. The extracted regions are mapped 203 to visual words using a dictionary of visual words and optionally a word histogram is formed 204. Optionally the content analysis engine stores 205 region parameters obtained at the region extraction stage 202 so that these parameters may be used by a ranking system 109. In an example, the extracted regions are detected using a Hessian-Affine detector. SIFT descriptors may then be computed at the extracted regions and quantized into visual words using any suitable dictionary. An example of a visual word dictionary is described in H. Jegou et al. "A contextual dissimilarity measure for accurate and efficient image search" in Proc. Comp. Vision Pattern Recogn. (CVPR), pages 1-8, 2007 which is incorporated herein in its entirety. Hessian-Affine detectors and SIFT descriptors are described in the following documents which are incorporated herein by reference in their entirety: David G. Lowe, "Object recognition from local scale-invariant features," International Conference on Computer Vision, Corfu, Greece (September 1999), pp. 1150-1157; Harris-Affine & Hessian Affine: K. Mikolajczyk and C. Schmid, Scale and Affine invariant interest point detectors. In IJC V 60(1):63-86, 2004.

Figure 3:
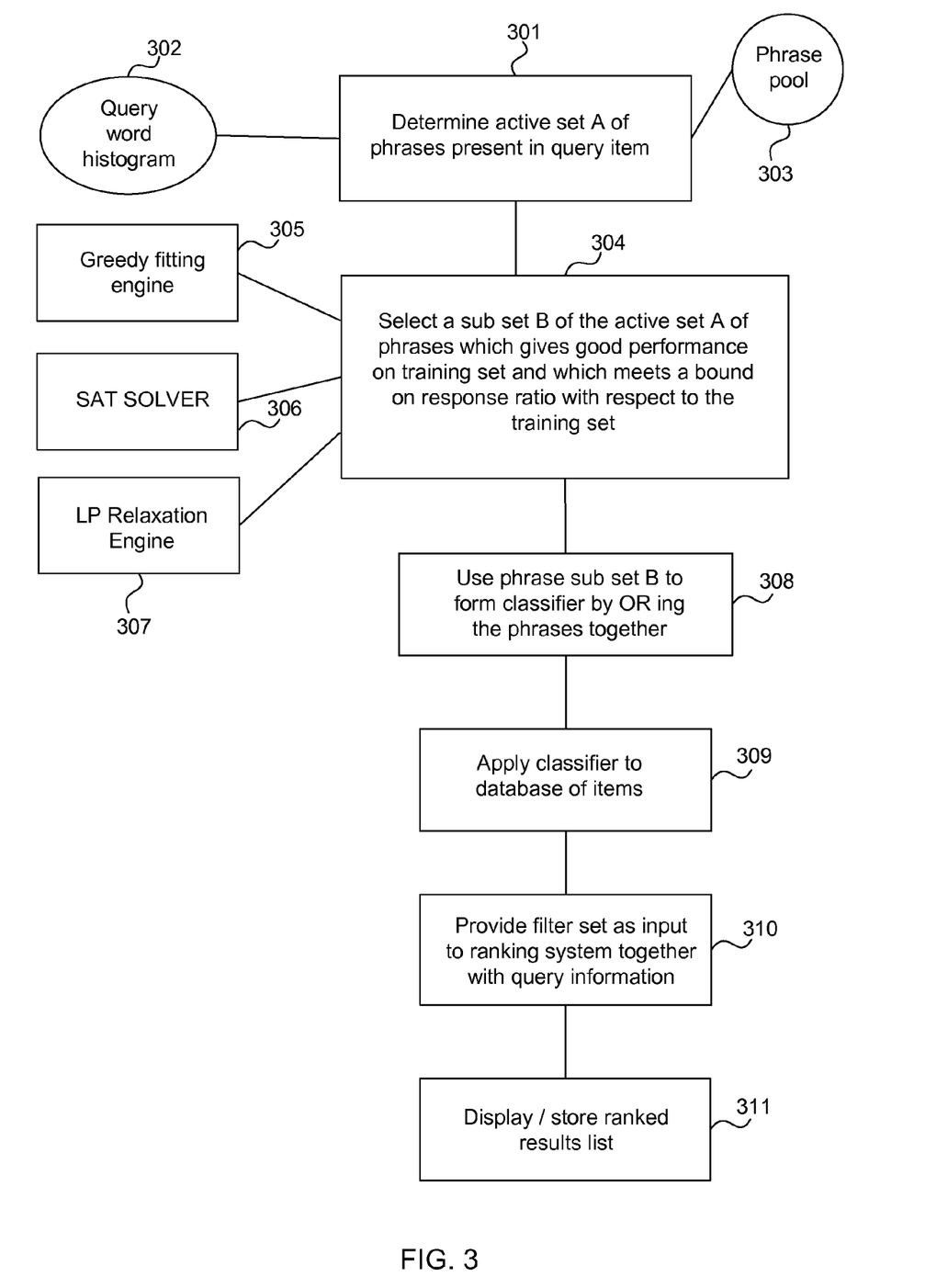
FIG. 3 is a flow diagram of a method of forming a classifier at query time and using the classifier to obtain a filter set of items from a database.

As illustrated in FIG. 3 the visual word histogram 302 of the query image is provided as input to a method at the classifier construction engine. This method is described in relation to the situation where the queries are images and the tokens are visual words. However, the method is also applicable to other types of query and other types of token. Other types of token may be color ranges for example or may be textons.

The term "phrase" is used herein to refer to a group of one or more tokens. For example, a phrase may be formed from a plurality of tokens combined using Boolean operators such as AND operators. A phrase may also comprise a histogram count condition on a single token, any Boolean function of tokens (or count conditions on tokens), or any Boolean-valued function of a tuple of tokens (where a tuple is an ordered set).

The classifier construction engine is arranged to specify 301 an active set of phrases which are those phrases present in the query item. In this example, the phrases are groups of visual words combined using AND operators. However, the phrases may be of any type as defined above using any type of token. The classifier construction engine optionally uses a phrase pool 303 when specifying the active set of phrases. The phrase pool is an example of a token pool (105 of FIG. 1) in which the tokens are formed into phrases. In the case that a phrase pool 303 is used, the active set of phrases are phrases present in both the query item and the phrase pool.

In order to form a classifier the classifier construction engine selects 304 a subset B of the active set A of phrases. The subset B is chosen so that it gives good performance on the training set. The training set contains some pairs of items which are known to be similar, as well as some items which are not labeled either as similar or dissimilar to each other. The term "good performance" is used here to mean that when the classifier is run on the training set, it classifies the "similar" pairs as similar. The term "good performance" does not indicate anything about the unlabelled examples (the "field set"), because the bound on response ratio implicitly means the classifier is arranged not to classify too many of the unlabelled examples as similar to the query.

The subset B is also chosen so that it meets a bound on response ratio with respect to the training set. The response ratio is the ratio of the number of items in the Filter set to the number of items in the database. The subset B is chosen so that the ratio of the number of items retrieved from the training set using the subset B as a classifier to the number of items in the training set is below a specified bound on response ratio. In this way the classifiers formed by the classifier construction engine may be arranged to provide practical filter set sizes for databases of different sizes, including web-scale applications. This may be achieved by adjusting the bound on response ratio appropriately.

The classifier construction engine is arranged to select subsets of tokens on the basis of their properties with respect to the training set of items.

The classifier construction engine uses the phrases in subset B to form 308 a classifier. In some embodiments the classifier construction engine uses only a single phrase. In other examples, the classifier construction engine combines phrases from subset B using OR operators. As described above, those phrases in subset B may be tokens combined using AND operators or may be phrases of any other type.

If an item in the database contains any one or more of the phrases in subset B it is classified as similar to the query item. In an example, each phrase is itself a plurality of visual words (or other tokens) combined using AND operators. In such examples, for a phrase to be present in a database item, each of those visual words needs to be present. In such examples, the classifier can therefore be thought of as an OR of AND filters (where the phrases are referred to as filters). It is found that this type of classifier provides a particularly efficient search.

As mentioned above, the classifier construction engine forms the classifier at query time. For example, the classifier is formed from the query item and used to retrieve the filter set 108 in a time on the order of 0.1 second. The resulting classifier is query-dependent in that it is formed using content from the query item and it is formed dynamically at query-time. The process of selecting the subset B of phrases is implemented using any suitable method such as by using a SAT solver 306, an LP relaxation engine 307 or by using a greedy fitting engine 305. The greedy fitting engine is arranged to use a Set Covering Machine algorithm as described in Marchand and Shawe-Taylor "The set covering machine" in the Journal of Machine Learning Research, 3:723-746, 2002 which is incorporated herein by reference in its entirety. In an embodiment, the greedy fitting engine is arranged to select the subset B of phrases in a compute time of around one second for a training set size on the order of 100K. Details of an example greedy fitting process used by this engine are given below.

The classifier is applied 309 to the database of items. In some embodiments, the database of items has an index which is arranged to be efficient for searching by AND queries. For example, this may be any type of inverted index and in some embodiments the database is implemented using skipped inverted files which are inverted files that allow limited random access via skip lists. Databases implemented using skipped inverted files are described in detail in Chapter 2 of Manning et al. "Introduction to Information Retrieval" published by Cambridge University Press 2008 which is incorporated herein by reference in its entirety. Using this type of database retrieval time is proportional to the number of results.

The filter set obtained from the database is provided 310 to a ranking system. For example, for a database of 1 billion items, the bound on response ratio may be set at 0.01%. The filter set size is then 105 for a given query. The filter set items may then be ranked using a fast linear ranker such as tf-idf (or any other suitable ranker). The tf-idf ranker is described in detail in Nister and Stewenius "Scalable recognition with a vocabulary tree" published in Proc. Comp. Vision Pattern Recogn. (CVPR), 2006 which is incorporated herein by reference in its entirety.

By limiting the size of the filter set the ranker may be a sophisticated process which is relatively expensive in terms of computational resources.

Figure 4:
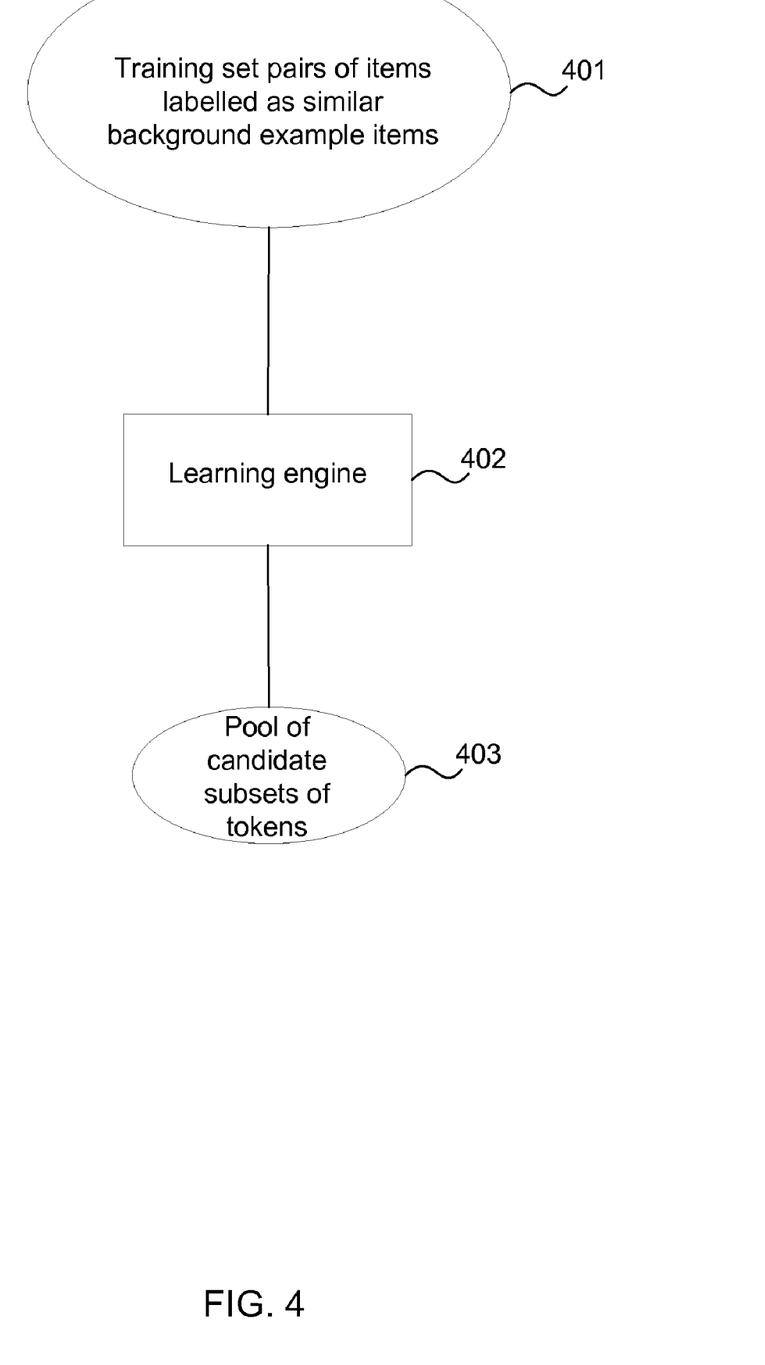
FIG. 4 is a schematic diagram of a learning engine for forming a pool of candidate token subsets.

FIG. 4 is a schematic diagram of a learning engine for forming a pool of candidate token subsets. A training set 401 is provided which comprises pairs of items labeled as similar as well as background example items. A learning engine 402 takes these training set items and uses them to form a pool 403 of candidate subsets of tokens. This process of forming the pool of candidates may be carried out off-line. It is not essential to form a pool of candidates in this way. However, by carrying out this off-line process it is possible to improve the quality of the search results. For example, it is possible to introduce some generality into the retrieval process. In this way, a query item of an instance of an object such as a chair may be used to retrieve images of objects of the class chair, rather than only images of the particular type of chair depicted in the query item. The learning engine uses specified constraints or properties that the pool of candidates are desired to have. By varying these constraints it is possible to change the behavior of the information retrieval system. In an example, the properties desired of the pool of candidates are: low response (the proportion of items retrieved from the training set should be lower than a specified bound), a high true-positive rate (all the training set items known to be similar to one another should be correctly identified as similar) and good coverage (good coverage means that as many training pairs as possible should be recalled by one or more phrases).

Figure 5:
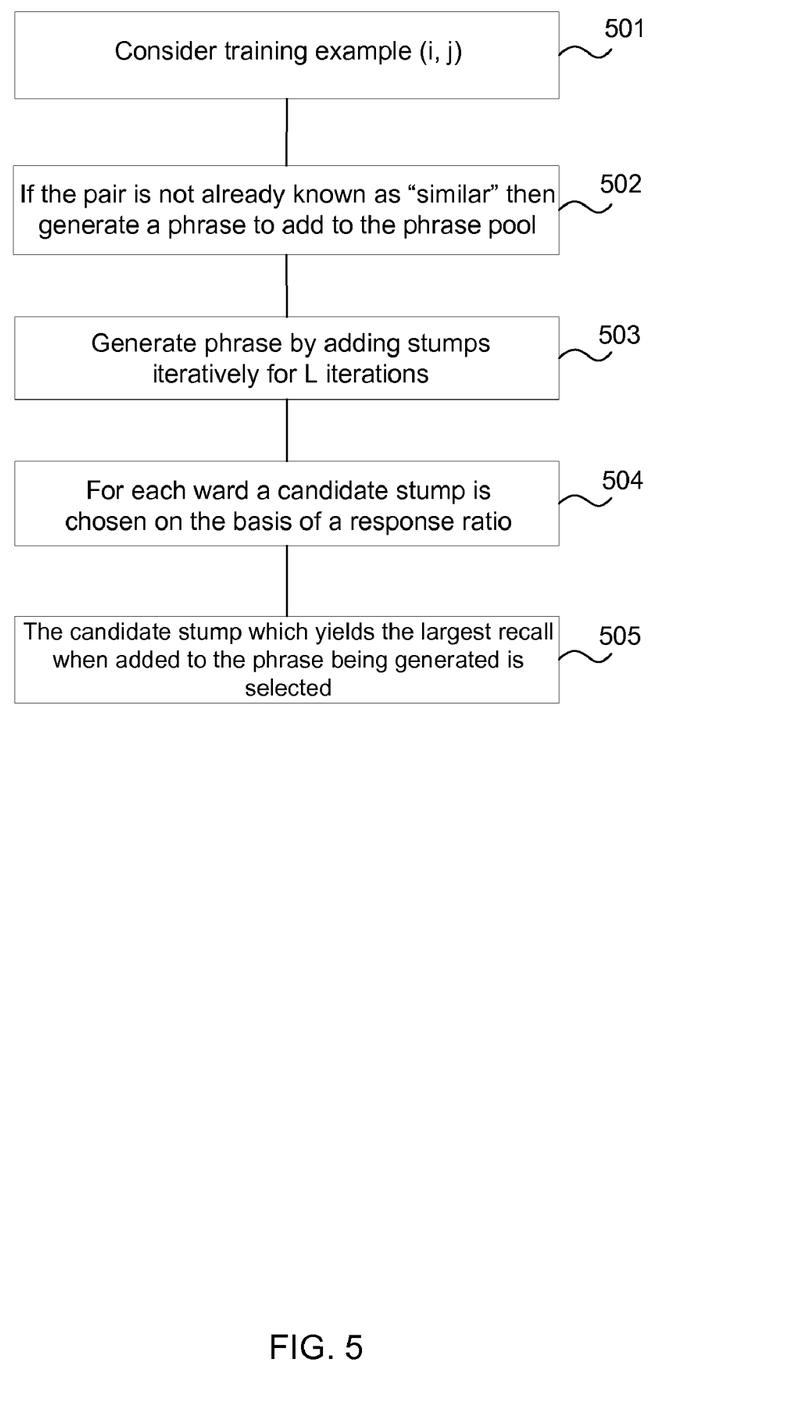
FIG. 5 is a flow diagram of a method at the learning engine of FIG. 4.

In an example, the learning engine 402 is arranged to carry out a process as now described with reference to FIG. 5. A pair of items from the training set is considered 501 and if the pair is not already known as "similar" then a phrase is generated 502 to add to the candidate phrase pool. The phrase is generated 503 by adding decision stumps iteratively for a specified number of iterations L. A decision stump is of the form "token w occurs more than t times" or "token w occurs fewer than t times" or "token w occurs between t1 and t2 times". A stump classifies two images as similar if it is true for both those images. For each token a candidate stump is chosen 504 on the basis of a response ratio and the candidate stump which yields the largest recall when added to the phrase being generated is selected 505.

In an embodiment the items are images and the tokens are visual words. In this example, the building block of the classifier is a decision stump of the form "word w occurs more than t times" or "word w occurs fewer than t times" or "word w occurs between t1 and t2 times". A generic stump is denoted by $C_s(h)$, whose parameters are $w_s$ and $t_s$. More formally $C_s$ is a binary function of a histogram $h = [h_1, \ldots, h_W]$ defined by $$C_s(h) = C(w_s, t_s; h) := (h_{w_s} > t_s)$$

A stump classifies images i and j as "similar" if it is true for both, i.e.

$$C_s(i,j) := C_s(h_i) \wedge C_s(h_j).$$

A "phrase" may be defined using a set of stumps S, which applies to a histogram h as follows:

$$P_S(h) := \bigwedge_{s \in S} C_s(h_i)$$

That is, a phrase is an AND of stumps. A phrase marks two images as similar if it is present in both:

$$Ps(i,j) := Ps(h_i) \cap Ps(h_j)$$

Finally, a complete classifier is defined as an OR of ANDs of phrases. The classifier is specified by a set $\Sigma$ of sets of stumps as follows $$Q_\Sigma(h_i, h_j) := \bigvee_{S \in \Sigma} Ps(h_i, h_j)$$
$$= \bigvee_{S \in \Sigma} \bigwedge_{s \in S} C_s(h_i, h_j)$$

The phrases which define the classifier are constructed so that each includes at most $\tau_C$ training examples, where $\tau_C$ is a small fraction of the response ratio bound $\tau$. By selecting a subset of the phrases in $\Sigma$ on a per-query basis, it is possible to control response (as measured on the training set) for that query. The training set comprises a field set of N histograms $\{h_1, \ldots, h_N\}$ and a set of M positive pair indices $$M\{(i_m, j_m)\}_{m=1}^{M},$$

where $(i,j) \in M$ iff images i and j are similar.

Note that the field set may contain many images which are not mentioned in the positive pair indices. For a new query image q, let the active set of phrases be the subset $A_q = \{S \in \Sigma | Ps(h_q)\}$; denoted $\{P_1, \ldots, P_K\}$ in the following. Then the evaluation of $Q_\Sigma(h_q, h_i)$ for any image i reduces to $$Q_\Sigma(h_q, h_i) = \bigvee_{k=1}^{K} P_k(h_i).$$

A subset B of $A_q$ is chosen such that the restricted classifier defined by B has good performance on the training set, subject to a maximum response rate $\tau$ on the field set. If the training set statistics are similar to the database statistics, this low response will apply once the query is issued against the database, and the response ratio will be close to the target. A subset B is represented by a binary indicator vector $b \in \{0,1\}^K$. The field set can be represented as an N×K binary matrix F where $F_{ik} = P_k(h_i)$, and the positive pairs by an analogous M×K matrix T, with $T_{mk} = P_k(h_{j_m}) \wedge P_k(h_{j_m})$. The classifier construction engine is arranged to choose b to maximize the number of true positives.

$$1^T(Tb>0)$$

subject to the response constraint $$1^T Fb < \tau.$$

Note that this constraint restricts the total postings list length of the response, i.e. the sum of the per-phrase filter set sizes. The above constraints may be expressed as an integer program by introducing slack variables in the form of binary vector $\xi \in \{0,1\}^K$, yielding the problem $$\min_{b,\xi} 1^T \xi \text{ subject to } Fb \geq 1 - \xi$$
$$v^T b < \tau$$

where $v = T^T 1$.

Given b, and hence the phrase subset $B \subset A_q \subset \Sigma$, the final query-specific filter applied to the database is $$\bigvee_{S \in B} Ps(h).$$

This may be expressed as an OR of ANDs, and the filter set is retrieved, and passed to the ranker.

In an example, selection of the phrase pool $\Sigma$ is performed in an offline training process. Some preliminary observations are that each phrase S defines an axis-aligned box in histogram space, and that $\Sigma$ defines a union of such boxes, which are referred to herein as the positive set.

A set of phrases $\Sigma$ are chosen which maximizes the number of true positives in the positive set:

$$TP = \sum_{(i,j) \in M} Q_\Sigma(h_i, h_j)$$

subject to upper bounds on the sizes of the individual boxes, represented by the following inequalities:

$$\sum_i Ps(h_i) < \tau_C \ \forall S \in \Sigma$$

As example process of phrase selection is now described which takes one parameter—the phrase length L, and returns a set of phrases $\Sigma$, with the following properties: all pairs are recalled ($\forall_{(i,j) \in M} Q_\Sigma(h_i, h_j) > 0$); each phrase satisfies specified conditions; and the sizes of the boxes are in some sense "large".

Starting with $\Sigma = \emptyset$, each training example (i, j) is considered in turn, and those for which $Q_\Sigma(i,j)$ is not already true will generate a phrase to add to $\Sigma$.

An example of the greedy fitting process mentioned above is now given. For such an example (i, j), the phrase is built from a series of stumps in L iterations, adding one stump per iteration. Let $P^{r-1}(h)$ be the partial phrase at iteration r, to which will be added a stump. For each word in the dictionary, a candidate stump of the form $h_w > t$ is chosen as the smallest t (i.e. largest box) for which the current cumulative response ratio $$\frac{1}{N} \sum_{i=1}^{N} P^{r-1}(h_i) \wedge (h_{iw} > t)$$

is below $(\tau_C)^{r/L}$. Thus the response constraint is progressively tightened until the final iteration, when it becomes equal to $\tau_C$. From the candidate stumps thus defined, the one which yields largest recall when added to $P^{r-1}(h)$ is selected.

Figure 6:
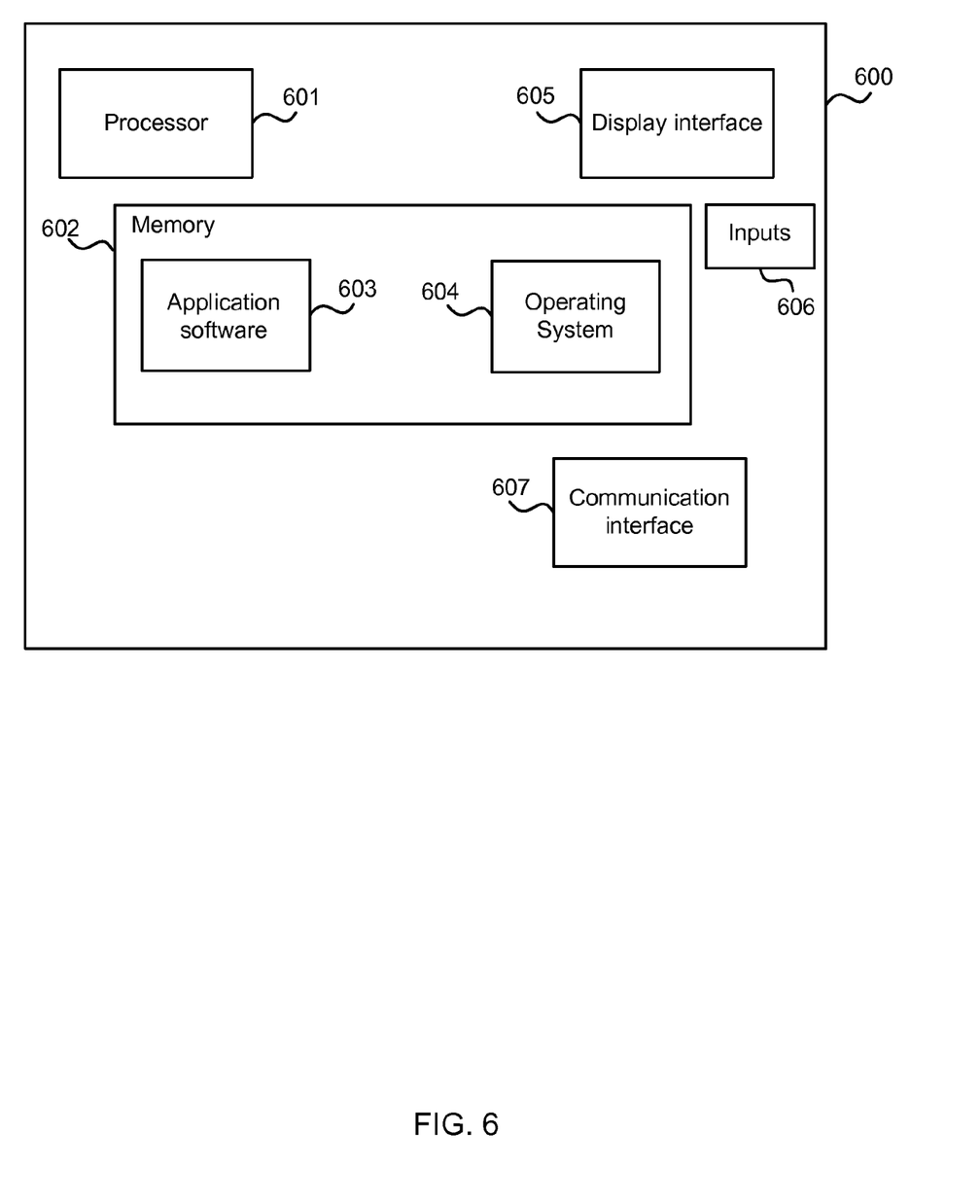
FIG. 6 illustrates an exemplary computing-based device in which embodiments of a content-based information retrieval system may be implemented.

FIG. 6 illustrates various components of an exemplary computing-based device 600 which may be implemented as any form of computing and/or electronic device, and in which embodiments of a content-based information retrieval system may be implemented.

The computing-based device 600 comprises one or more inputs 606 which are of any suitable type for receiving media content, Internet Protocol (IP) input, query items, training sets of items or other input required by a content-based information retrieval system. The device also comprises communication interface 607.

Computing-based device 600 also comprises one or more processors 601 which may be microprocessors, controllers or any other suitable type of processors for processing computing executable instructions to control the operation of the device in order to perform content-based information retrieval. Platform software comprising an operating system 604 or any other suitable platform software may be provided at the computing-based device to enable application software 603 to be executed on the device.

The computer executable instructions may be provided using any computer-readable media, such as memory 602. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. The output may also provide a filter set of results to a ranking system. A display interface 605 is optionally provided for example, to implement a graphical user interface, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or substantially simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of similar item retrieval comprising:
   receiving a query item;
   analyzing content of the query item, the analyzing comprising identifying tokens in that query item using a library of tokens, wherein each token comprises a symbol representing a cluster of features;
   dynamically forming a classifier, using a processor, at query time on the basis of the query item's content and a training set of items, wherein the training set comprises a plurality of pairs of items and a plurality of background items such that for each pair, the items in that pair are specified as similar to one another, the forming the classifier comprising choosing a subset of the identified tokens such that, on the training set as many as possible of the similar pairs have the chosen subset of tokens while the number of background items containing the subset of tokens is below a specified bound; and
   using the classifier to select a plurality of items from a database of items.

2. The method as claimed in claim 1, wherein the classifier is formed from groups of tokens and wherein those groups of tokens are themselves combined using OR operators.

3. The method as claimed in claim 1 wherein the classifier is formed from at least one phrase, each phrase being formed from any of: a single token, a histogram count condition on a single token, a Boolean function of tokens, a Boolean function of count conditions on tokens, a Boolean-valued function of an ordered set of tokens.

4. The method as claimed in claim 1 wherein the step of forming the classifier comprises using an automated optimizer.

5. The method as claimed in claim 1 which further comprises providing the items selected from the database to a ranking system to obtain a ranked list of items.

6. The method as claimed in claim 1 which further comprises generating a pool of candidate subsets of tokens from the training set of items using a learning engine.

7. The method as claimed in claim 1, wherein the items are images and wherein the tokens are visual words.

8. The method as claimed in claim 1, wherein the items are images and wherein similar items comprise images of objects of a same object class.

9. The method as claimed in claim 8, wherein the query item comprises objects of classes absent from the training set.

10. The method as claimed in claim 1, wherein the training set comprises some items which are not specified as similar or dissimilar to each other.

11. A content-based image search apparatus comprising:
- an input arranged to receive a query image;
- a content analysis engine arranged to identify tokens in the query image;
- a classifier construction engine arranged to form a classifier on the basis of the identified tokens in the query image and on the basis of a training set of images by selecting a subset of the identified tokens such that the proportion of images in the training set which are classified as similar to the query image using the selected subset of the identified tokens is below a specified bound;
- a processor arranged to use the formed classifier to classify images from a database of images according to their similarity to the query image; and
- an output arranged to provide images from the database on the basis of their classification.

12. The apparatus as claimed in claim 11 wherein the classifier construction engine is arranged to form classifiers by combining tokens using AND operators to form groups of tokens and to combine groups of tokens using OR operators.

13. The apparatus as claimed in claim 11 wherein the classifier construction engine is arranged to form classifiers by combining tokens to form groups of tokens and to combine groups of tokens using OR operators.

14. The apparatus as claimed in claim 11, which further comprises a learning engine arranged:
- to receive the training set of images, at least some of the images being identified as pairs of similar images, and
- to form a pool of candidate subsets of tokens.

15. The apparatus as claimed in claim 11, wherein the training set comprises some images which are not specified as similar or dissimilar to each other.

16. One or more storage devices with device-executable instructions for performing operations comprising:
- receiving a query item;
- analyzing content of the query item, the analyzing the content of the query item comprising identifying tokens in that query item using a library of tokens, wherein each token comprises a symbol representing a cluster of features;
- dynamically forming a classifier at query time on the basis of the query item's content and the basis of properties of that content with respect to a training set of items, the training set comprising a plurality of pairs of items and a plurality of background items such that for each pair, the items in that pair are specified as similar to one another, the forming the classifier comprising choosing a subset of the identified tokens such that, on the training set as many as possible of the similar pairs have the chosen subset of tokens while the number of background items containing the subset of tokens is below a specified bound; and
- using the classifier to select a plurality of items from a database of items.

17. The one or more storage devices as claimed in claim 16, wherein the training set comprises some items which are not specified as similar or dissimilar to each other.

* * * * *